(12) United States Patent
Lyu

(10) Patent No.: US 9,351,018 B2
(45) Date of Patent: May 24, 2016

(54) METHOD FOR RECEIVING VIEWING-RESTRICTED CHANNEL

(75) Inventor: Jungmin Lyu, Seongnam-si (KR)

(73) Assignee: Humax Co., Ltd., Seongnam-si (KR)

( * ) Notice: Subject to any disclaimer, the term of this patent is extended or adjusted under 35 U.S.C. 154(b) by 336 days.

(21) Appl. No.: 13/104,364

(22) Filed: May 10, 2011

(65) Prior Publication Data

US 2012/0060179 A1    Mar. 8, 2012

(30) Foreign Application Priority Data

Sep. 7, 2010   (KR) ........................ 10-2010-0087248

(51) Int. Cl.
| | |
|---|---|
| *H04N 21/2225* | (2011.01) |
| *H04N 21/2347* | (2011.01) |
| *H04N 21/258* | (2011.01) |
| *H04N 21/266* | (2011.01) |
| *H04N 21/4405* | (2011.01) |
| *H04N 21/4623* | (2011.01) |
| *H04N 21/472* | (2011.01) |

(52) U.S. Cl.
CPC ....... *H04N 21/2225* (2013.01); *H04N 21/2347* (2013.01); *H04N 21/25816* (2013.01); *H04N 21/26613* (2013.01); *H04N 21/4405* (2013.01); *H04N 21/4623* (2013.01); *H04N 21/47202* (2013.01)

(58) Field of Classification Search
CPC .............. H04N 21/41; H04N 21/4104; H04N 21/4108; H04N 21/4135; H04N 21/43; H04N 21/4402; H04N 21/440218; H04N 21/440263; H04N 21/4405; H04N 21/442; H04N 21/44204

USPC ...................................................... 725/25–30
See application file for complete search history.

(56) References Cited

U.S. PATENT DOCUMENTS

| | | | | |
|---|---|---|---|---|
| 6,622,307 | B1 | 9/2003 | Ho | ................ 725/120 |
| 7,739,707 | B2 * | 6/2010 | Sie et al. | .......... 725/25 |
| 7,921,440 | B1 * | 4/2011 | Kolde et al. | ..... 725/28 |
| 2003/0046100 | A1 * | 3/2003 | Yamauchi | .......... 705/1 |
| 2004/0250273 | A1 * | 12/2004 | Swix et al. | ...... 725/25 |
| 2008/0141303 | A1 * | 6/2008 | Walker et al. | ... 725/39 |
| 2009/0300671 | A1 * | 12/2009 | Scott et al. | ...... 725/27 |
| 2010/0146527 | A1 * | 6/2010 | Craib et al. | ........ 725/5 |
| 2012/0017250 | A1 * | 1/2012 | Tirasirikul et al. | .... 725/85 |

FOREIGN PATENT DOCUMENTS

EP    1 117 214   A2    7/2001

OTHER PUBLICATIONS

European Search Report dated Oct. 23, 2014 issued in Application No. 11180261.7.

* cited by examiner

*Primary Examiner* — Omar S Parra
(74) *Attorney, Agent, or Firm* — KED & Associates LLP

(57) ABSTRACT

A method for receiving a viewing-restricted channel is disclosed. In one embodiment of the present invention, if a user makes a request for receiving a viewing-restricted channel, a command requesting decoding and transmitting broadcast signals of the viewing-restricted channel is generated and transmitted to a broadcast receiver equipped with a CAS module through a network, and broadcast data decoded at the broadcast receiver is received through the network and played after being processed as audio/video signals. If broadcast signals transcoded in a different bit rate at the broadcast receiver is received, the transcoded broadcast data can be decoded in an appropriate way and played.

8 Claims, 5 Drawing Sheets

FIG. 3
List of pay channels
| Virtual Channel Number | BS Name |
|---|---|
| CH 78 | XXXX |
| CH 82 | XXYZ |
| ⋮ | ⋮ |
| CH 302 | XXZZ |
FIG. 4
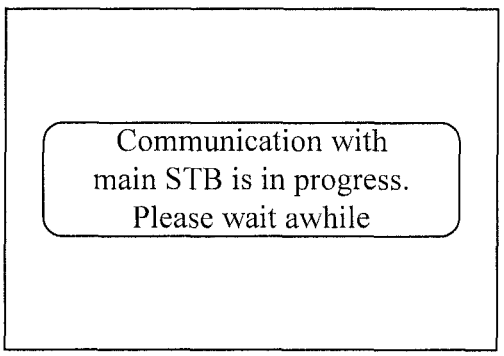
Communication with main STB is in progress. Please wait awhile
CH 78

METHOD FOR RECEIVING VIEWING-RESTRICTED CHANNEL

BACKGROUND

1. Field

This document relates to a method for receiving viewing-restricted channel. More specifically, this document relates to a method for receiving broadcast signals of a pay channel in an apparatus not equipped with a function of receiving encoded broadcast signals of a pay channel.

2. Related Art

Various types of digital broadcast receivers such as a set-top box (STB) and a digital television (D-TV) are now in wide use. The set-top box decodes broadcast programs in the form of MPEG data streams received through a broadcast channel into audio and video data and outputs the decoded broadcast programs to a television.

A set-top box equipped with a function of receiving broadcast signals of a viewing-restricted channel (e.g., a pay channel) further comprises a conditional access system (CAS) module and a descrambler. As is well known, a smart card is inserted to the CAS module to be used as a user authentication card for receiving broadcast signals of a pay channel.

Also, the CAS module to which the smart card is inserted generates a control word to be used as a key code for descrambling encoded broadcast streams of a pay channel; the descrambler, by using the control word, carries out a series of operations for descrambling encoded broadcast streams of a pay channel.

Accordingly, the user of a set-top box additionally equipped with the CAS module and the descrambler can watch an encoded broadcast program provided through a pay channel in a normal manner.

Recently, the number of cases is increasing, where people use a main set-top box (STB) equipped with a function of receiving broadcast signals of a pay channel together with one or more sub-STBs not equipped with a function of receiving broadcast signals of the pay channel through a wired or wireless network.

SUMMARY

An aspect of this document is to provide a method for receiving and playing broadcast programs of a viewing-restricted channel.

A method for receiving a viewing-restricted channel according to one embodiment of the present invention comprises receiving a request for receiving a viewing-restricted channel from a user; and generating a command requesting for decoding and transmitting broadcast signals of the viewing-restricted channel and transmitting the generated command to a broadcast receiver through a network.

In one embodiment, virtual channel numbers and corresponding broadcast station names corresponding to at least one or more viewing-restricted channels are managed as a viewing-restricted channel list and based on the viewing-restricted channel list, it can be checked whether the requested channel is a viewing-restricted channel.

In one embodiment, the viewing-restricted channel is a pay channel and the broadcast receiver is equipped with a CAS module.

In one embodiment, the method further comprises receiving broadcast data decoded by the broadcast receiver through the network and playing the received broadcast data.

In one embodiment, the receiving and playing can comprise processing the decoded broadcast data to audio/video signals.

In one embodiment, the broadcast data received by the broadcast receiver is transcoded data with a different bit rate; and the receiving and playing can comprise decoding the transcoded broadcast data.

An apparatus for receiving a viewing-restricted channel according to another embodiment of the present invention comprises a communication module for connecting to a broadcast receiver through a network; a signal processing module for processing broadcast data transmitted through broadcast signals or a network; and a controller for generating a command requesting for decoding and transmitting broadcast data of a viewing-restricted channel when a user requests receiving the viewing-restricted channel, and transmitting the command to a broadcast receiver through the network by controlling the communication module.

Therefore, the user can watch a broadcast program of a pay channel through an apparatus not additionally equipped with a CAS module and a descrambler.

BRIEF DESCRIPTION OF THE DRAWINGS

The implementation of this document will be described in detail with reference to the following drawings in which like numerals refer to like elements.

FIG. 3 illustrates an embodiment of a pay channel list managed in a sub set-top box to which the present invention is applied;

FIG. 4 illustrates an embodiment of a guide message output by a sub set-top box and a broadcast screen of a pay channel to which the present invention is applied;

DETAILED DESCRIPTION

In what follows, preferred embodiments of a method for receiving a viewing-restricted channel according to the present invention will be described in detail with reference to appended drawings.

A method for receiving a viewing-restricted channel according to the present invention can be applied to various types of broadcast receivers such as a set-top box (STB) or a digital television (D-TV) receiving digital broadcast signals. In addition, the present invention can be applied to an apparatus comprising a communication module and a signal processing module for receiving and playing broadcast data transmitted by a broadcast receiver.

An apparatus to which the present invention is applied, e.g., a broadcast receiver such as an STB, can be used being connected to a television and also be connected to other STBs through a wired or wireless network.

Figure 1:
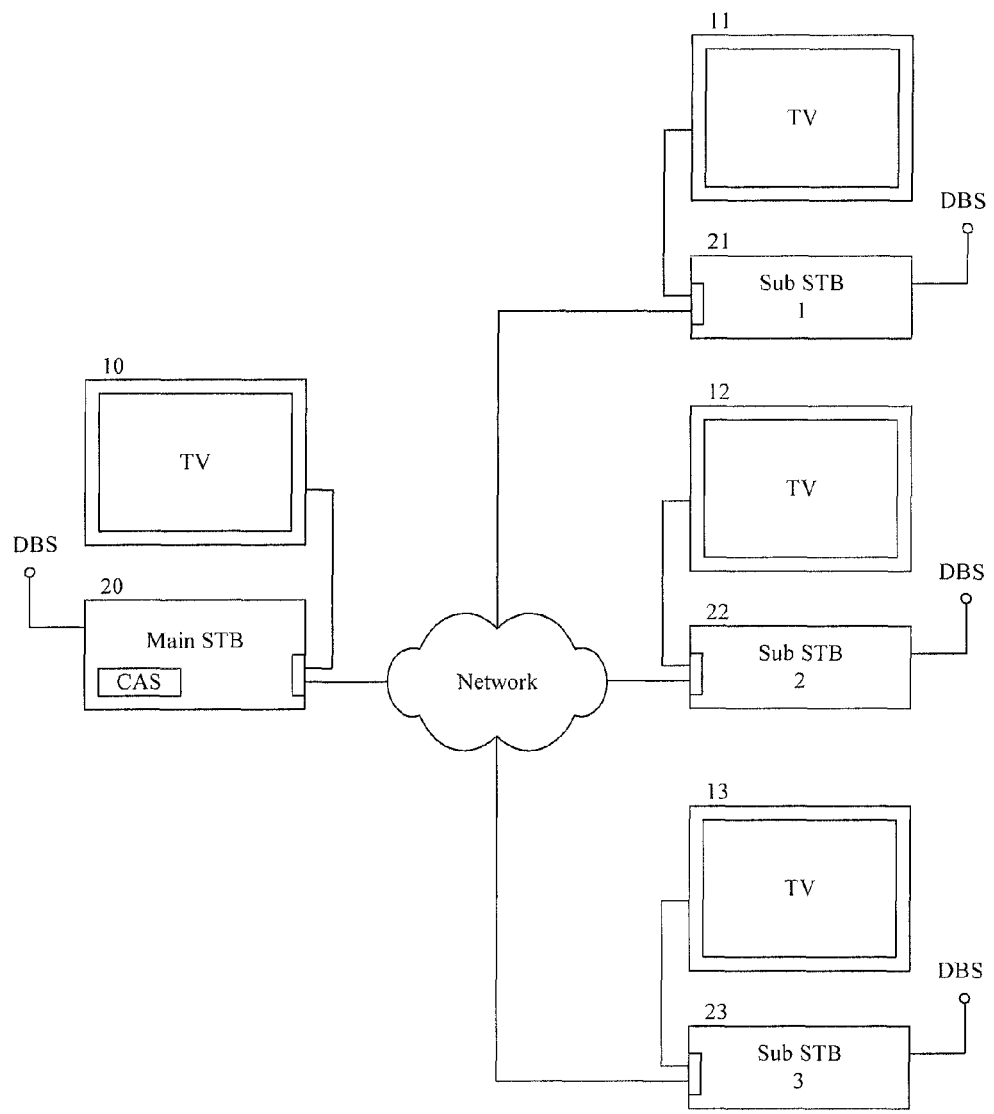
FIG. 1 illustrates an embodiment to which the present invention is applied, where a main set-top box and sub set-top boxes are connected to each other through a network.

For example, as shown in FIG. 1, a main STB 20 equipped with a CAD module for receiving broadcast signals of a viewing-restricted channel (e.g., a pay channel) can be connected to at least one or more sub-STBs 21, 22, 23 not equipped with the CAS module through a wired or wireless network.

Figure 2:
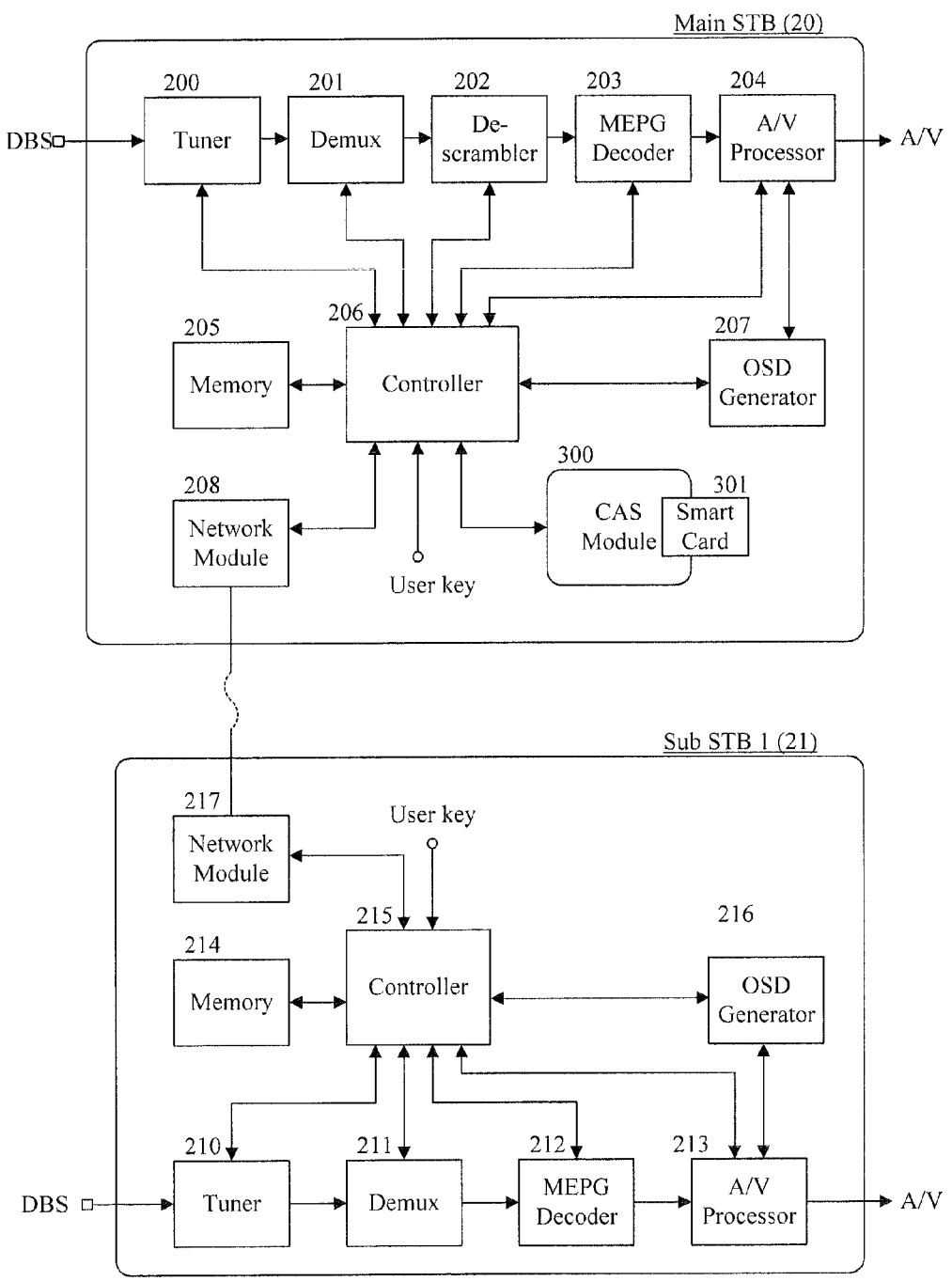
FIG. 2 illustrates an embodiment of structure where a main set-top box and sub set-top boxes to which the present invention is applied.

The main STB 20, for example, as shown in FIG. 2, can comprise a tuner 200, a demux 201, a descrambler 203, an MPEG decoder 203, an A/V processor 204, a memory 205, a controller 206, an OSD generation unit 207, a network module 208, and a CAS module 300. A smart card 301 is inserted to the CAD module to be used as a user authentication card for receiving broadcast signals of a play channel.

On the other hand, the sub-STB 21, for example, as shown in FIG. 2, can comprise a tuner 210, a demux 211, an MPEG decoder 212, an A/V processor 213, a memory 214, a controller 215, an OSD generation unit 216, and a network module 217.

In other words, since the sub-STB 21 is not equipped with a separate CAS module needed for receiving broadcast signals of a pay channel, it can be manufactured in a relatively lower cost than the main STB 20.

The memory of the sub-STB 214, for example, can employ a non-volatile memory such as a flash memory or EEPROM and as shown in FIG. 3, a pay channel list can be stored in the memory 214.

The pay channel list manages a pay channel number as a virtual channel number with which the user can select the pay channel number which can be played by receiving broadcast data through an interface to the main STB 20 although the data cannot be decoded independently in the sub-STB 21.

Also, the broadcast station name of the corresponding channel can be stored in association with the virtual channel number, where the broadcast station name can be used as a unique identification code for identifying each broadcast station.

The controller 215 of the sub-STB 215, if the user selects a pay channel number, carries out interface operation with the main STB 20 by controlling the network module 217.

The controller 215 controls the OSD generation unit 216 and outputs a guide message corresponding thereto; for example, as shown in FIG. 4, the guide message can display a message requesting a brief standby due to communication with the main STB.

Also, the controller 215 generates a command requesting tuning in to the broadcast signals of the pay channel and decoding and transmission of the broadcast signals; and transmits the command to the main STB 20. Afterwards, the controller 215 receives broadcast signals of the pay channel encoded by the main STB 20 and outputs the received broadcast signals through a television, which will be described in more detail below.

Figure 5:
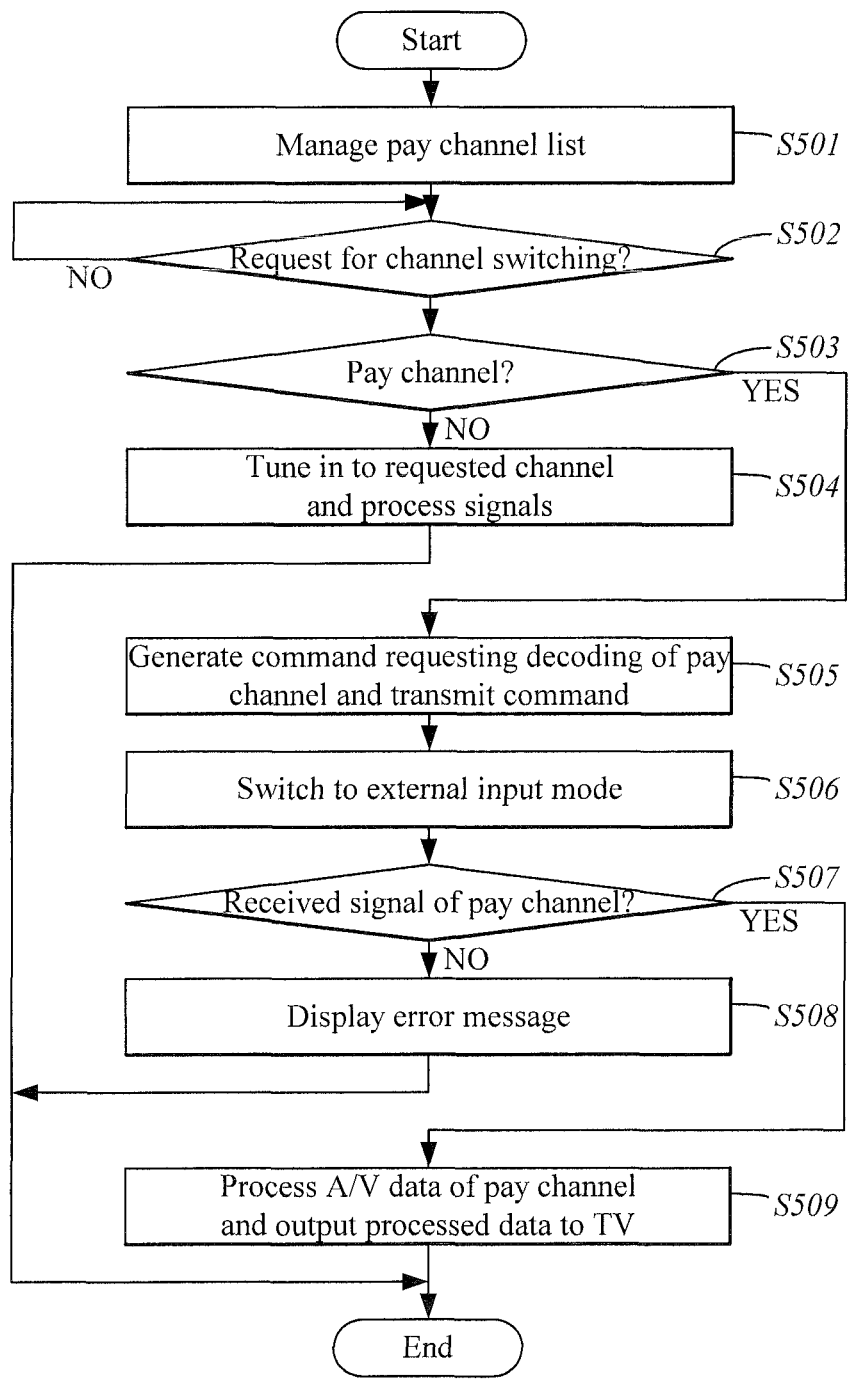
FIG. 5 illustrates a flow diagram in a sub set-top box to which the present invention is applied.
Figure 6:
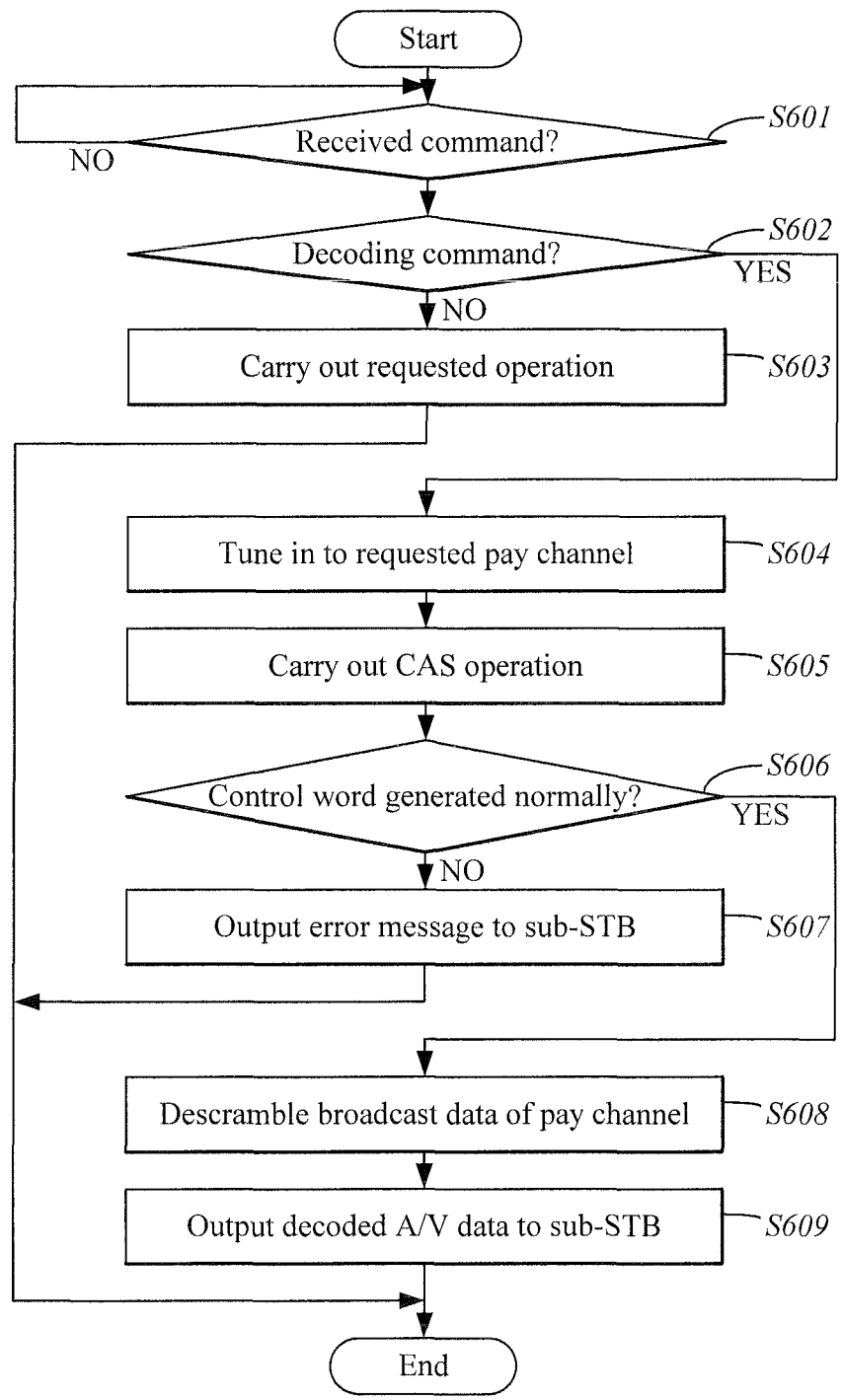
FIG. 6 illustrates a flow diagram in a main set-top box to which the present invention is applied.

FIGS. 5 and 6 illustrate flow diagrams of a method for receiving broadcast signals of a pay channel according to the present invention.

As shown in FIG. 5, the sub-STB 21 manages a pay channel list in a non-volatile memory 214 such as a flash memory or EEPROM, where a virtual channel number and a broadcast station name are associated with each other S501.

The controller 215, by controlling the tuner 210 and the demux 211 according to the key inputs of the user, tunes in to a broadcast channel desired by the user; for example, the controller 215, if broadcast channel switching operation is requested by the key inputs of the user S502, checks whether the requested broadcast channel corresponds to an encoded pay channel.

If it is found that the requested broadcast channel is not a pay channel, the controller 215, by controlling the tuner 210 and the demux 211, tunes in to the corresponding broadcast channel and by controlling the MPEG decoder 212 and the A/V processor 213, decodes broadcast data in the form of MPEG data streams received through the broadcast channel into audio and video signals S504.

On the other hand, if it is found that the request broadcast channel is a pay channel, the controller 215, by controlling the network module 217, carries out interface operation with the main STB 20 connected through a wired or wireless network and at the same time, as described with reference to FIG. 4, by controlling the OSD generation unit 216, displays a guide message requesting a brief standby due to communication with the main STB.

Next, the controller 215 generates a command requesting tuning in to the broadcast signals of the pay channel and decoding and transmission of the broadcast signals; and transmits the generated command to the main STB 20, S505; for example, the command can comprise a channel number and a broadcast station name corresponding to the pay channel; and a unique network identification information (e.g., serial number or IP address) assigned to the sub-STB 21.

The controller 215, after transmitting the command to the main STB 20 as described above, automatically switches the operation mode of the sub-STB from a tuner mode to an external input mode S506 and checks whether broadcast signals of a pay channel selected and decoded by the main STB 20 are received through the network module 217, S507.

The controller 215, if the decoded broadcast signals of the pay channel are not received, by controlling the OSD generation unit 216, displays an error message corresponding to the situation S508; the error message can include various messages informing of disconnection to a network, power-off of the main STB, user authentication failure at the CAS module, and so on.

Meanwhile, if the decoded broadcast signals of the pay channel are received, the controller 215 carries out audio and video signal processing operation and outputs the processed signals through a television S509; for example, if A/V data which have passed all through the descrambler 202 and the MPEG decoder 203 in the main STB 20 are received, the controller 215 controls the A/V processor 213 in the sub-STB to carry out audio and video signal processing operation.

The controller 215, if MPEG data which have passed the descrambler 202 in the main STB 20 but not the MPEG decoder 203 are received, controls the MPEG decoder 212 and the A/V processor 213 in the sub-STB to carry out MPEG decoding operation; and audio and video signal processing operation.

Meanwhile, as shown in FIG. 6, if a request command is received from the sub-STB 21 connected through the network module 208, S601, the controller 206 of the main STB 20 checks whether the request command is a decoding request command which requests decoding and transmission of broadcast signals of a pay channel S602.

The controller 206, if the checking result is not to the decoding request command, carries out operation corresponding thereto S603, while if the checking result is the decoding request command, based on the virtual channel number and the broadcast station name included in the request command, controls the tuner 200 and the demux 201; and tunes in to a pay channel corresponding thereto.

Also, the controller 206, by controlling the CAS module 300, carries out operation of generating a control word used as an encoding key S605; for example, if the smart card 301 inserted in the CAS module 300 is turned out to be inappropriate for receiving broadcast signals of the pay channel in a normal manner (e.g., user authentication failure), chances are that a valid control word may not be generated.

The controller 206, if the control word is not generated normally S606, outputs an error message corresponding to the situation to the sub-STB 21, S607 while if the control word is generated normally, outputting the control word to the descrambler 202 so that encoded broadcast signals of a pay channel is descrambled by the descrambler 202, S608.

In addition, the controller 206, by controlling the MPEG decoder 203 and the A/V processor 204, processes the descrambled broadcast signals by applying MPEG decoding and A/V signal processing; and outputs the result to the sub-STB connected through the network module 208, S609; for example, the sub-STB 21 can be identified by a unique network identifying information (e.g., serial number) of the sub-STB 21 received being included in the request command.

Also, the main STB 20, by further comprising the MPEG encoder, can encode A/V data which have undergone descrambling and MPEG decoding with a different bit rate (which is transcoding of broadcast signals) and transcoded broadcast data to the sub-STB 21 through the network module 208.

The sub-STB 21, if broadcast signals are transcoded and transmitted from the main STB 20, can decodes the received, transcoded broadcast data through the MPEG decoder 212 or a different decoding processing unit in an appropriate way and play the decoded broadcast data.

Meanwhile, the main STB 20, if pay channel decoding operation is requested from the sub-STB 21 while receiving broadcast data from an ordinary broadcast channel, can make the CAS module 300 and the descrambler 202 not currently used at the main STB shared with the sub-STB 21 remotely through a network.

For example, the sub-STB 21, by controlling the tuner 210 and the demux 211, tunes in to a pay channel requested by the user and at the same time, the sub-STB 21 transmits encoded broadcast signals received through the pay channel to the main STB 20, thus making the CAS module 306 of the main STB 20 generate a control word.

In the same way, the sub-STB 21, by using the control word, can make the descrambler 202 of the main STB descramble encoded broadcast signals received from the sub-STB 21; receive again the descrambled broadcast signals; and apply MPEG decoding and A/V signal processing thereto.

The preferred embodiments of the present invention described above have been introduced for the purpose of illustration. Therefore, it should be understood that various kinds of improvement, modification, and substitution of the embodiments; and addition thereof are possible to those skilled in the art within the technical principles and scope of the present invention defined by appended claims.

What is claimed is:

1. A method for receiving a viewing-restricted channel in a broadcast receiver without a conditional access system (CAS) module, comprising:
   determining whether a requested channel is a viewing-restricted channel during a channel switching operation by a user;
   when the viewing-restricted channel is requested during the channel switching operation, transmitting, to a second broadcast receiver equipped with the CAS module through a network, a command requesting for decoding broadcast signals of the viewing-restricted channel into broadcast data and transmitting the decoded broadcast data and switching an operation mode from a tuner mode to an input mode;
   receiving the broadcast data from the second broadcast receiver through the network; and
   processing the broadcast data to audio/video signals.

2. The method of claim 1, wherein virtual channel numbers and corresponding broadcast station names corresponding to at least one or more viewing-restricted channels are managed as a viewing-restricted channel list, and a determination whether the requested channel is a viewing-restricted channel is based on the viewing-restricted channel list.

3. The method of claim 1, wherein the viewing-restricted channel is a pay channel.

4. The method of claim 1, wherein the broadcast data is transcoded data with a different bit rate, and the receiving and the processing of the broadcast data comprises decoding the transcoded broadcast data.

5. An apparatus for receiving a viewing-restricted channel without a conditional access system (CAS) module, comprising:
   a communication module for connecting to a broadcast receiver through a network;
   a signal processing module for processing broadcast data transmitted through broadcast signals or a network; and
   a controller for generating a command requesting for decoding and transmitting broadcast signals of a viewing-restricted channel into broadcast data and transmitting the decoded broadcast data when a requested channel is the viewing-restricted channel during a channel switching operation by a user, switching an operation mode of the apparatus from a tuner mode to an input mode, transmitting the command to the second broadcast receiver equipped with the CAS module through the network and receiving the broadcast data from the second broadcast receiver through the network by controlling the communication module, and playing the received broadcast data by controlling the signal processing module.

6. The apparatus of claim 5, further comprising a storage for storing virtual channel numbers and corresponding broadcast station names corresponding to at least one or more viewing-restricted channels as a viewing-restricted channel list, the controller determining whether the requested channel is a viewing-restricted channel based on the viewing-restricted channel list in the storage.

7. The apparatus of claim 5, wherein the viewing-restricted channel is a pay channel.

8. The apparatus of claim 5, wherein the controller, when broadcast data transcoded at a different bit rate by the second broadcast receiver are received, plays the transcoded broadcast data after decoding the data by controlling the signal processing module.

* * * * *